(12) United States Patent
Bae et al.

(10) Patent No.: US 11,874,928 B2
(45) Date of Patent: Jan. 16, 2024

(54) SECURITY DEVICE, ELECTRONIC DEVICE, SECURE BOOT MANAGEMENT SYSTEM, METHOD FOR GENERATING BOOT IMAGE, AND METHOD FOR EXECUTING BOOT CHAIN

(71) Applicant: SAMSUNG ELECTRONICS CO., LTD., Suwon-si (KR)

(72) Inventors: Ki Seok Bae, Hwaseong-si (KR); Jong Hoon Shin, Hwaseong-si (KR); Ki Tak Kim, Siheung-si (KR); Hye Soo Lee, Yongin-si (KR); Jin Su Hyun, Seoul (KR); Hyo Sun Hwang, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 552 days.

(21) Appl. No.: 17/000,748

(22) Filed: Aug. 24, 2020

(65) Prior Publication Data
US 2021/0240833 A1 Aug. 5, 2021

(30) Foreign Application Priority Data
Jan. 30, 2020 (KR) .................. 10-2020-0011001

(51) Int. Cl.
*G06F 21/57* (2013.01)
*H04L 9/08* (2006.01)
*H04L 9/32* (2006.01)

(52) U.S. Cl.
CPC .......... *G06F 21/575* (2013.01); *G06F 21/572* (2013.01); *H04L 9/0861* (2013.01);
(Continued)

(58) Field of Classification Search
CPC ................ G06F 21/575; G06F 21/572; G06F 2221/033; H04L 9/0861; H04L 9/0897; H04L 9/3242; H04L 9/3247; H04L 9/3268
See application file for complete search history.

(56) References Cited

U.S. PATENT DOCUMENTS 8,332,636 B2   12/2012 Murase et al.
8,843,765 B2   9/2014 Dellow
(Continued)

FOREIGN PATENT DOCUMENTS

KR   1020120092222 A   8/2012
KR   1020150078546 A   7/2015
(Continued)

*Primary Examiner* — Aurel Prifti
(74) *Attorney, Agent, or Firm* — Sughrue Mion, PLLC

(57) ABSTRACT

Provided is a security device, an electronic device, a secure boot management system, a method for generating a boot image and a method for executing a boot chain. The security device includes a key deriver configured to receive a root key and a protected boot key included in a boot image and generate a derived key according to a key protection method using the root key and the protected boot key, a key processor configured to perform verification according to the key protection method using the generated derived key to extract a boot key from the protected boot key included in the boot image, a secure booter configured to perform verification on a protected execution image included in the boot image using the extracted boot key, and a processor configured to execute a verified execution image on which the verification has been completed by the secure booter.

8 Claims, 20 Drawing Sheets

(52) U.S. Cl.
CPC .......... *H04L 9/0897* (2013.01); *H04L 9/3242*
(2013.01); *H04L 9/3247* (2013.01); ***H04L
9/3268*** (2013.01); *G06F 2221/033* (2013.01)

(56) References Cited

U.S. PATENT DOCUMENTS

| | | | |
|---|---|---|---|
| 9,239,920 | B2 | 1/2016 | Ashkenazi |
| 10,181,956 | B2 | 1/2019 | Jeansonne et al. |
| 10,185,669 | B2 | 1/2019 | Hans et al. |
| 2008/0288762 | A1* | 11/2008 | Chen ................... G06F 21/575 713/1 |
| 2014/0250290 | A1* | 9/2014 | Stahl ................... H04L 9/3247 713/2 |
| 2014/0281575 | A1* | 9/2014 | Springfield ............ G06F 21/72 713/189 |
| 2016/0099922 | A1* | 4/2016 | Dover ................... H04L 9/0822 713/171 |
| 2017/0011219 | A1* | 1/2017 | Li ........................ H04L 9/3234 |
| 2017/0039352 | A1 | 2/2017 | Volkening et al. |
| 2017/0097830 | A1* | 4/2017 | Ehrenberg ............ G06F 21/602 |
| 2017/0124329 | A1* | 5/2017 | Ghafoor ................ G06F 21/575 |
| 2017/0177872 | A1* | 6/2017 | McLean ................ H04L 9/0861 |
| 2017/0187526 | A1 | 6/2017 | Ferguson et al. |
| 2017/0337380 | A1* | 11/2017 | Domke .................. H04L 63/06 |
| 2018/0004954 | A1* | 1/2018 | Liguori ................. H04L 9/3239 |
| 2018/0006815 | A1* | 1/2018 | Young ................... H04L 9/0891 |
| 2018/0314831 | A1* | 11/2018 | Liu ....................... H04L 9/3247 |
| 2019/0065750 | A1* | 2/2019 | Bolan .................... G06F 21/64 |
| 2019/0163910 | A1* | 5/2019 | Moon ...................... G06F 8/65 |
| 2020/0134185 | A1* | 4/2020 | Cho ....................... G06F 21/602 |
| 2020/0145395 | A1* | 5/2020 | Kanungo ............... H04L 9/0841 |
| 2020/0293662 | A1* | 9/2020 | Gupta ..................... G06F 8/654 |
| 2021/0019419 | A1* | 1/2021 | Mathane ................ G06F 9/445 |
| 2021/0124818 | A1* | 4/2021 | Muthukumaran .... H04L 9/0894 |
| 2021/0232691 | A1* | 7/2021 | Bishop .................. H04L 9/3236 |

FOREIGN PATENT DOCUMENTS

| | | |
|---|---|---|
| KR | 1020170017713 A | 2/2017 |
| KR | 101968382 B | 4/2019 |

* cited by examiner

SECURITY DEVICE, ELECTRONIC DEVICE, SECURE BOOT MANAGEMENT SYSTEM, METHOD FOR GENERATING BOOT IMAGE, AND METHOD FOR EXECUTING BOOT CHAIN

CROSS-REFERENCE TO RELATED APPLICATION

This application claims priority under 35 U.S.C. 119 from Korean Patent Application No. 10-2020-0011001, filed on Jan. 30, 2020 in the Korean Intellectual Property Office, the entire contents of which are incorporated herein by reference.

BACKGROUND

1. Field

Apparatuses and methods consistent with embodiments relate to a security device, an electronic device, a secure boot management system, a method for generating a boot image, and a method for executing a boot chain.

2. Description of the Related Art

In general, electronic devices execute a boot image to perform initialization and perform a boot operation that loads the boot image (or a kernel, an operating system (OS), etc.). If the boot operation is performed by an unauthorized boot image, there is a risk such as data replication or execution of illegal application programs. Most manufacturers have used a secure boot chain that provides confidentiality by encrypting a boot image or checks for tampering of a boot image by verifying a signature of the boot image.

SUMMARY

Aspects of exemplary embodiments provide a security device, an electronic device and a secure boot management system having improved security reliability.

Aspects of exemplary embodiments also provide a boot image generating method and a boot chain execution method having improved security reliability.

It is understood, however, that aspects of the present disclosure are not restricted to those set forth herein. The above and other aspects of the present disclosure will become more apparent to one of ordinary skill in the art to which the present disclosure pertains by referencing the detailed description provided below.

According to an aspect of an exemplary embodiment, there is provided a security device including: a key deriver configured to receive a root key and a protected boot key included in a boot image and generate a derived key according to a key protection method using the root key and the protected boot key, a key processor configured to perform verification according to the key protection method using the generated derived key to extract a boot key from the protected boot key included in the boot image, a secure booter configured to perform verification on a protected execution image included in the boot image using the extracted boot key, and a processor configured to execute a verified execution image on which the verification has been completed by the secure booter.

According to an aspect of another exemplary embodiment, there is provided an electronic device including: a storage device configured to store a boot image including a protected boot key and a protected execution image, and a security device configured to store a root key and perform a boot operation to execute the boot image using the root key, wherein the security device is configured to generate a derived key according to a predetermined key protection method using the root key and the protected boot key, perform verification according to the predetermined key protection method using the generated derived key to extract a boot key from protected boot key, and perform the boot operation using the extracted boot key.

According to an aspect of another exemplary embodiment, there is provided a secure boot management system including: a key deriver configured to receive a root key and a key protection method and generate a derived key according to the received key protection method, a key protector configured to perform a protection operation on a boot key according to the key protection method using the generated derived key to generate a protected boot key, and a boot image generation system configured to perform a protection operation on an execution image using the boot key, and generate a boot image including the protected boot key and the protected execution image.

According to an aspect of another exemplary embodiment, there is provided a method for generating a boot image, the method including: receiving a root key and a key protection method, generating a derived key using the root key according to the received key protection method, performing a protection operation on a boot key according to the key protection method using the generated derived key to generate a protected boot key, and performing a protection operation on an execution image using the boot key, and generating a boot image including the protected boot key and the protected execution image.

According to an aspect of another exemplary embodiment, there is provided a method for executing a boot chain, the method including: receiving a root key and a protected boot key included in a boot image, generating a derived key using the root key and the protected boot key according to a key protection method, performing verification according to the key protection method using the generated derived key, and extracting a boot key from the protected boot key included in the boot image, performing verification on a protected execution image included in the boot image using the extracted boot key, and executing a verified execution image on which the verification has been completed to execute the boot image.

BRIEF DESCRIPTION OF THE DRAWINGS

The above and other aspects and features will become more apparent by describing in detail exemplary embodiments thereof with reference to the attached drawings, in which.

DETAILED DESCRIPTION OF THE EMBODIMENTS

Hereinafter, exemplary embodiments of the present disclosure will be described with reference to the accompanying drawings. Throughout the disclosure, expressions such as "at least one of a, b or c" (or "at least one of a, b, and c") indicates only a, only b, only c, both a and b, both a and c, both b and c, or all of a, b, and c.

Figure 1:
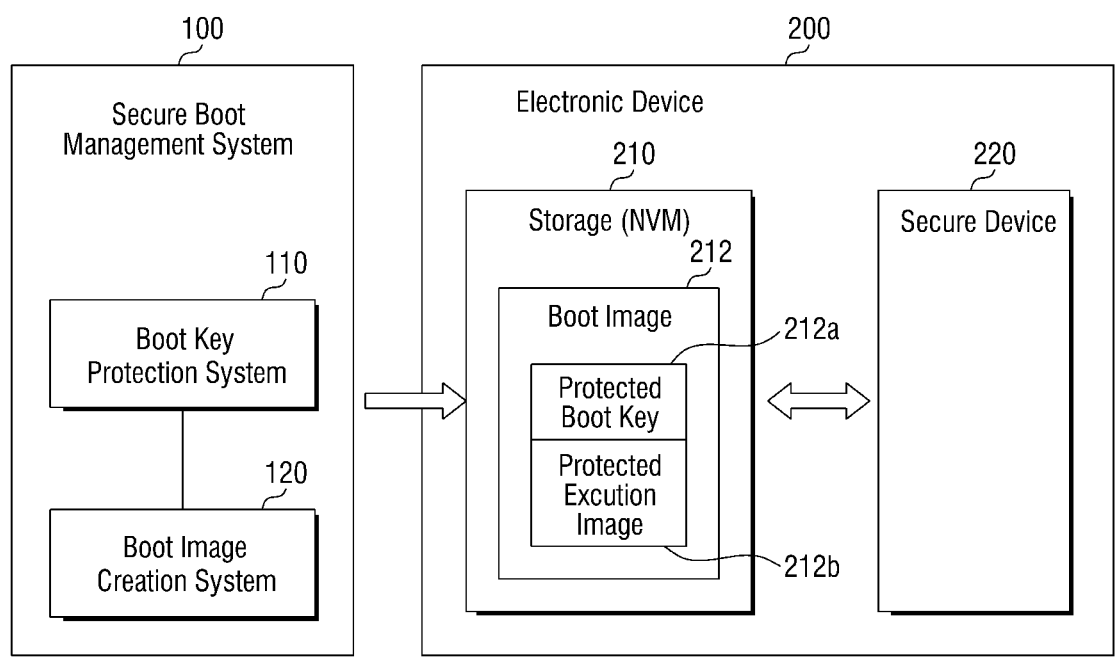
FIG. 1 is a block diagram illustrating a security system according to an embodiment.

FIG. 1 is a block diagram illustrating a security system 1 according to an embodiment.

Referring to FIG. 1, a security system 1 may include a secure boot management system 100 and an electronic device 200.

The secure boot management system 100 may create a boot image 212 including a protected boot key 212*a* and a protected execution image 212*b*. In the present embodiment, a boot image is used as a generic term for an image, a kernel, an operating system (OS), and the like used in a booting operation of the electronic device 200.

The secure boot management system 100 may include a boot key protection system 110 and a boot image generation system 120.

The boot key protection system 110 may generate the protected boot key 212*a* required or used by the boot image generation system 120 to create the boot image 212.

The boot image generation system 120 may generate the protected execution image 212*b* using a boot key and receive the protected boot key 212*a* generated from the boot key protection system 110. Further, the boot image generation system 120 may generate the boot image 212 including the protected boot key 212*a* and the protected execution image 212*b*.

In some embodiments, the secure boot management system 100 may be implemented in the form of a server. In this case, the boot key protection system 110 and the boot image generation system 120 included in the secure boot management system 100 may be implemented as software modules, respectively. It is understood, however, that embodiments are not limited thereto, and the boot key protection system 110 and the boot image generation system 120 may be implemented as hardware, respectively.

The electronic device 200 may store the boot image 212 created by the secure boot management system 100 and execute the stored boot image 212 to perform a boot operation.

The electronic device 200 may include a storage device 210 and a security device 220.

The storage device 210 may store the boot image 212 created by the secure boot management system 100. Specifically, the storage device 210 may store the boot image 212 created to include the protected boot key 212*a* and the protected execution image 212*b* according to embodiments.

The boot image 212 created by the secure boot management system 100 may be provided to the electronic device 200 through various methods. In some embodiments, the boot image 212 may be provided from the secure boot management system 100 to be stored in the storage device 210 at the time of production of the electronic device 200. It is understood, however, that one or more other embodiments are not limited thereto. For example, in one or more other embodiments, the boot image 212 may be provided from the secure boot management system 100 to be stored in the storage device 210 through wireless and/or wired communication while the electronic device 200 is operating.

The storage device 210 may include a nonvolatile memory device. Specifically, the storage device 210 may be configured to include at least one of, for example, a phase-change RAM (PRAM), a magneto-resistive RAM (MRAM), a resistive RAM (ReRAM), a ferro-electric RAM (FRAM), a NAND flash memory, a NOR flash memory, etc.

The security device 220 may execute the boot image 212 stored in the storage device 210 to perform a boot operation of the electronic device 200.

The security device 220 may be manufactured in the form of an integrated circuit (IC) and mounted on the electronic device 200. A detailed operation of the security device 220 is described below.

Hereinafter, configurations of the boot key protection system 110, the boot image generation system 120, the storage device 210, and the security device 220 according to one or more embodiments are described in more detail below with reference to FIGS. 2 to 7.

Figure 2:
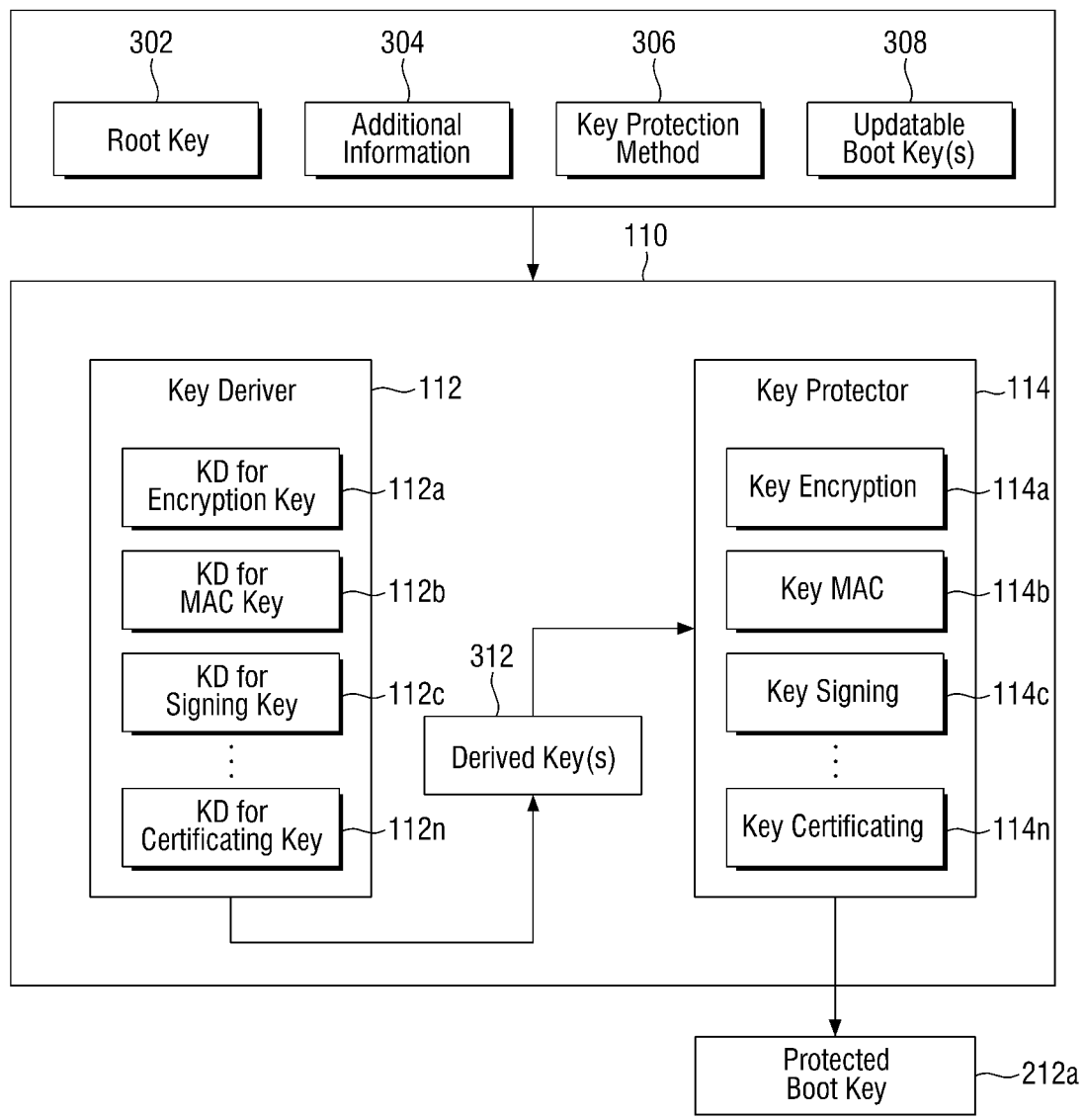
FIG. 2 is a block diagram explaining a boot key protection system of FIG. 1, according to an embodiment.

FIG. 2 is a block diagram explaining the boot key protection system 110 of FIG. 1, according to an embodiment.

Referring to FIG. 2, the boot key protection system 110 may include a key deriver 112 and a key protector 114.

The key deriver 112 is provided with a root key 302, additional information 304 (e.g., user additional information), and a key protection method 306, and may generate a derived key 312 from the root key 302.

In detail, the key deriver 112 may generate, using the root key 302, the derived key 312 required or used to protect a boot key 308 according to the provided key protection method 306. In this case, if the additional information 304 is determined as necessary or to be used for security by a user, the key deriver 112 may generate the derived key 312 in consideration of the additional information 304.

In the present embodiment, the derived key 312 may be a key protection key used to protect the boot key 308 according to the key protection method 306.

The key protection method 306 may be implemented in various manners as needed, designed, or desired. By way of example, as the key protection method 306 for safe booting, a boot image cryptographic method and a boot image verification method may be used.

First, in order to ensure the confidentiality of a boot image, a secret key cryptography may be used. Here, the secret key cryptography may use any or most of secret key cryptographic algorithms based on international standards. Generally, when a secret key is exposed to the outside, an encrypted boot image may be decrypted. Therefore, the secret key may be used only in a safe environment managed by a manufacturer and may be managed so as not to be exposed to the outside.

Next, the boot image verification method is a method capable of verifying whether a boot image has been created from a legitimate manufacturer. The boot image verification method may include, for example, a message authentication code (MAC)-based verification method or a public key-based signature method.

In the MAC-based verification method, a MAC value of a boot image is generated using a MAC key recognized only by a manufacturer, and the generated MAC value is stored in an electronic device together with the boot image. Subsequently, the stored MAC value is verified in a safe booting operation of the electronic device, thereby checking whether the stored boot image has been created from a legitimate user or whether the boot image has been tampered.

Here, the MAC key may be used to check tampering of the boot image. The MAC key is a key set by the manufacturer and may be a value generated when a secure boot image is created. The MAC key thus generated and the MAC value stored together with the boot image may be used in a MAC authentication process. The MAC key may be used to verify both tampering of the boot image and legitimacy of a boot image producer.

In the public key-based signature method, a signature value is generated using a private key and the generated signature value is stored in an electronic device together with a boot image. Subsequently, the stored signature value is verified using a public key in a safe booting step of the electronic device, thereby checking whether the boot image has been generated from a legitimate user or whether the boot image has been tampered.

Here, the private key may be used as a boot image signature generation key. The private key may be needed to generate an additional signature value for checking tampering of the boot image. The boot image signature generation key needs to or may be securely managed at the same level as for a secret key used in the secret key cryptography.

On the other hand, the public key may be used as a boot image signature verification key. The public key may be needed or used to verify a signature of the boot image.

Unlike the secret key cryptography or the MAC-based verification method, the public key-based signature method may use a scheme of separating a key used for generating a signature value from a key used for verifying the signature value. Since a signature generation key cannot be regenerated using only a signature verification key (public key), an additional key protection may not be required for the signature verification key, and the signature verification key (public key) itself may be viewable.

The key deriver 112 may include a plurality of sub-key derivers 112a to 112n to generate the derived key 312 used in such various key protection methods 306.

Although only four sub-key derivers 112a, 112b, 112c and 112n are exemplarily shown in detail in the drawing, it is understood that this is merely an example and one or more other embodiments are not limited thereto. The key deriver 112 may further include additional sub-key derivers in another embodiment, or fewer sub-key derivers in another embodiment.

When (or based on) a secret key cryptography is used as the key protection method 306, the sub-key deriver 112a may generate a derived key 312 used for the secret key cryptography.

When (or based on) a MAC operation is used as the key protection method 306, the sub-key deriver 112b may generate a derived key 312 used for the MAC operation.

When (or based on) a public key-based signature is used as the key protection method 306, the sub-key deriver 112c may generate a derived key 312 used to generate an electronic signature.

When (or based on) a network standard certificate is used as the key protection method 306, the sub-key deriver 112n may generate a derived key 312 used to generate a certificate.

The key protector 114 may use the derived key 312 to perform a protection operation on the boot key 308 according to the key protection method 306, thereby generating the protected boot key 212a.

Specifically, the key protector 114 may generate the protected boot key 212a from the boot key 308 according to the provided key protection method 306 using the derived key 312.

The key protector 114 may have a configuration corresponding to the key deriver 112. In detail, if the key deriver 112 includes a plurality of sub-key derivers 112a to 112n in order to generate the derived key 312 used in various key protection methods 306, the key protector 114 may also include sub-key protectors 114a to 114n corresponding to the plurality of sub-key derivers 112a to 112n included in the key deriver 112.

Although only four sub-key protectors 114a, 114b, 114c and 114n are exemplarily shown in detail in the drawing, it is understood that this is merely an example and one or more other embodiments are not limited thereto. The key protector 114 may further include additional sub-key protectors in another embodiment, or fewer sub-key derivers in another embodiment.

When (or based on) a secret key cryptography is used as the key protection method 306, the sub-key protector 114a may generate a protected boot key 212a by encrypting the boot key 308 using the derived key 312.

When (or based on) a MAC operation is used as the key protection method 306, the sub-key protector 114b may generate a protected boot key 212a by performing the MAC operation on the boot key 308 using the derived key 312.

When (or based on) a public key-based signature is used as the key protection method 306, the sub-key protector 114c may generate a protected boot key 212a by generating an electronic signature for the boot key 308 using the derived key 312.

When (or based on) a network standard certificate is used as the key protection method 306, the sub-key protector 114n may generate a protected boot key 212a by generating a certificate for the boot key 308 using the derived key 312.

In FIG. 2, the root key 302, the user additional information 304, the key protection method 306, and the boot key 308 used in the operation of the boot key protection system 110 are illustrated separately from the boot key protection system 110. It is understood, however, that this is for simplicity of description and one or more other embodiments are not limited thereto.

In some embodiments, the boot key protection system 110 may be modified to store all of the root key 302, the additional information 304, the key protection method 306, and the boot key 308. Further, in some other embodiments, some of the root key 302, the user additional information 304, the key protection method 306, and the boot key 308 may be stored in the boot key protection system 110, and the rest may be stored in the secure boot management system 100 shown in FIG. 1.

In some embodiments, a plurality of key protection methods 306 may be used to generate the protected boot key 212a. For example, when a first key protection method 306 and a second key protection method 306, which are different from each other, are used to generate the protected boot key 212a, the key deriver 112 may generate a first derived key 312 required or used for the first key protection method 306 from the root key 302, and generate a second derived key 312 required or used for the second key protection method 306 from the root key 302.

That is, the key deriver 112 may generate, from the same root key 302, the first and second derived keys 312 that are different from each other.

In this case, the key protector 114 may perform a first protection operation on the boot key 308 using the first derived key 312 according to the first key protection method 306, and perform a second protection operation on the boot key 308 using the second derived key 312 according to the second key protection method 306, thereby generating the protected boot key 212a.

In other words, many various key protection methods 306 may be used to generate the protected boot key 212a according to the needs of the user.

Figure 3:
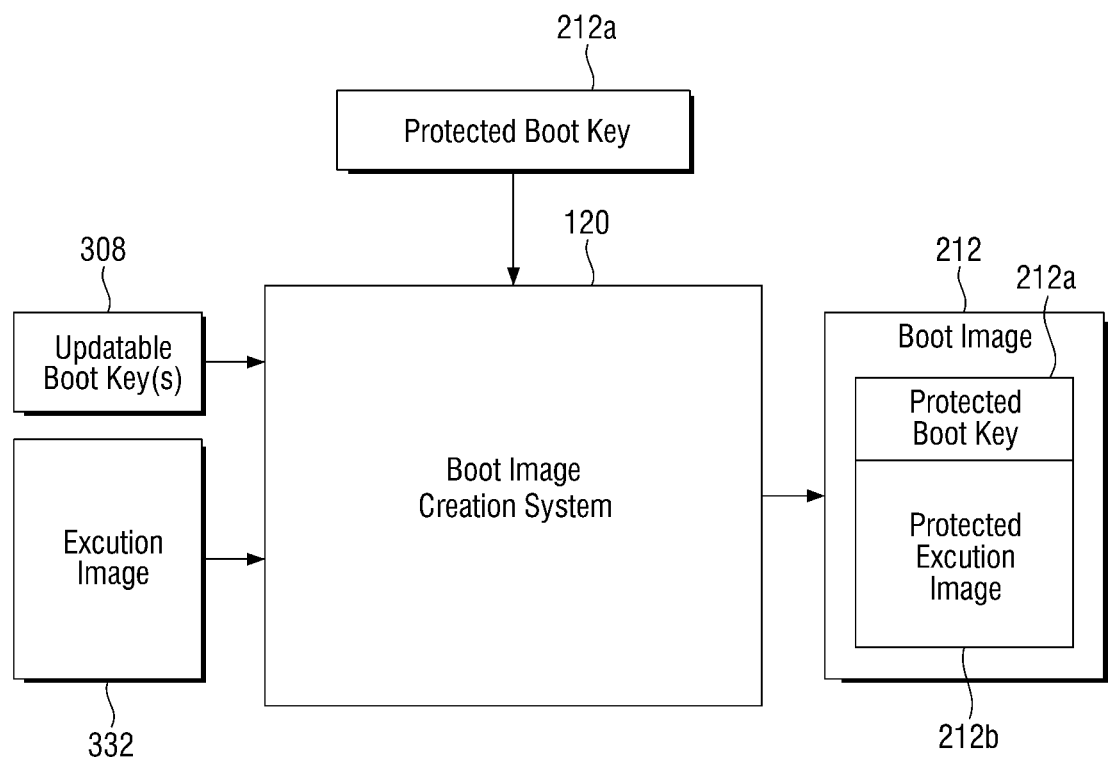
FIG. 3 is a block diagram explaining a boot image generation system of FIG. 1, according to an embodiment.

FIG. 3 is a block diagram explaining the boot image generation system 120 of FIG. 1, according to an embodiment.

Referring to FIG. 3, the boot image generation system 120 may receive the protected boot key 212a from the boot key protection system 110. Further, the boot image generation system 120 may generate a protected execution image 212b by performing a protecting operation on an execution image 332 using the boot key 308 that is updatable several times. Additionally, the boot image generation system 120 may generate a boot image 212 including the protected boot key 212a and the protected execution image 212b.

In some embodiments, the execution image 332 may have been stored in the storage device of the secure boot management system 100 of FIG. 1, but it is understood that one or more other embodiments are not limited thereto.

Figure 4:
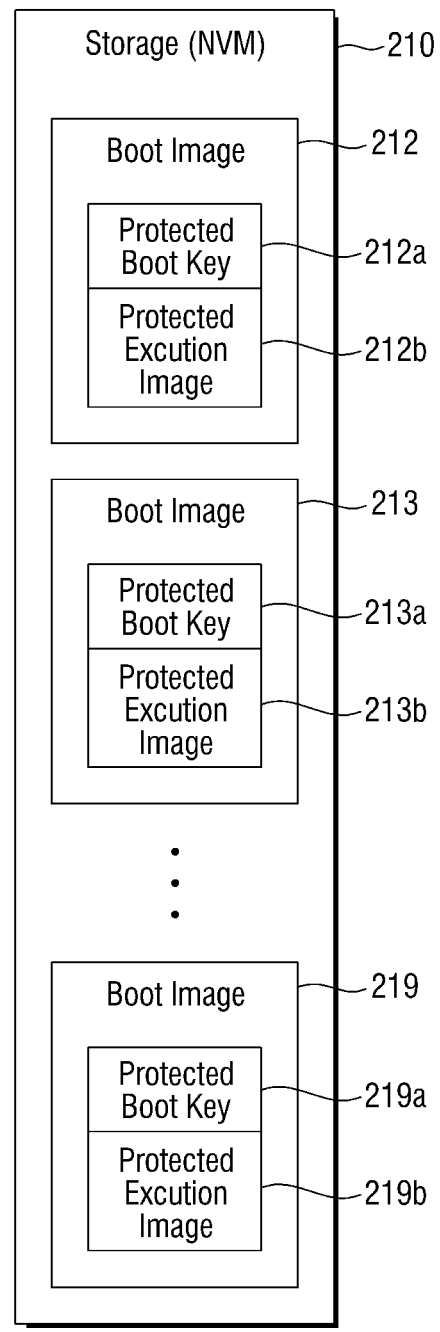
FIG. 4 is a diagram explaining a storage device of FIG. 1, according to an embodiment.

FIG. 4 is a diagram explaining the storage device 210 of FIG. 1, according to an embodiment.

Referring to FIG. 4, the storage device 210 of the electronic device 200 (of FIG. 1) may store therein the boot image 212, including the protected boot key 212a and the protected execution image 212b, generated by the secure boot management system 100 (of FIG. 1) according to one or more embodiments.

In some embodiments, the storage device 210 may store therein a plurality of boot images 212 to 219 as needed or instructed. The plurality of boot images 212 to 219 may include different protected boot keys 212a to 219a and protected execution images 212b to 219b, respectively.

In other words, the plurality of boot images 212 to 219 may include the protected boot keys 212a to 219a and the protected execution images 212b to 219b, respectively, which are generated by different key protection methods 306 (of FIG. 3).

Figure 5:
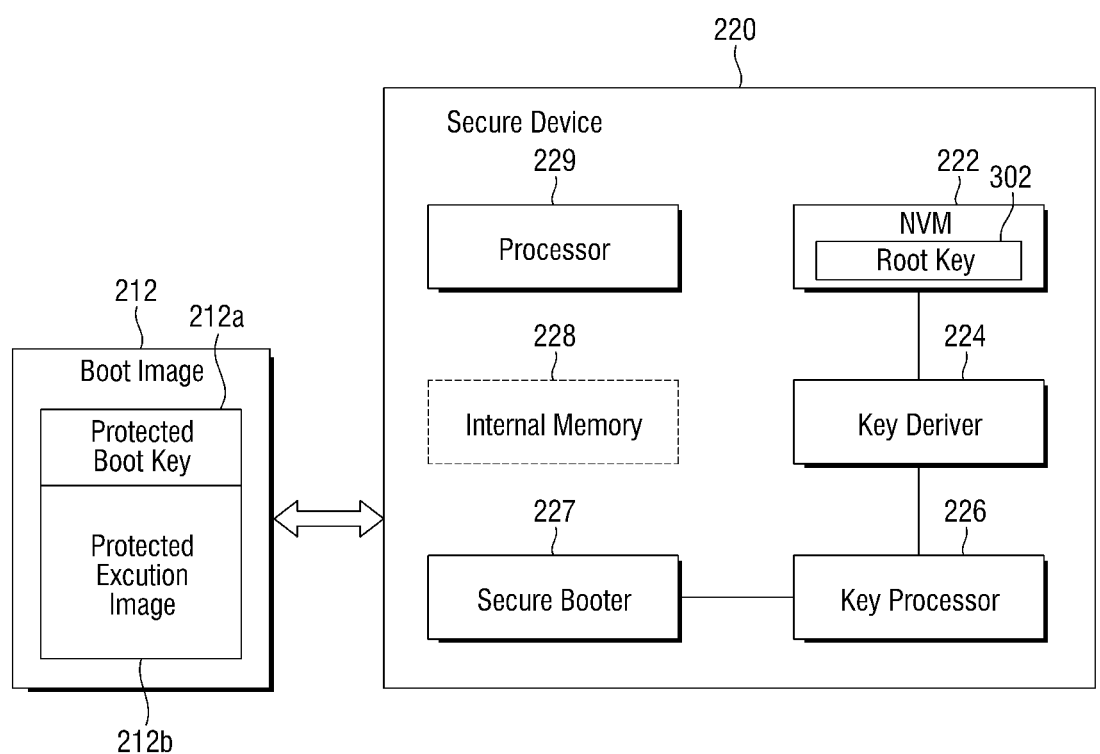
FIG. 5 is a block diagram explaining a security device of FIG. 1, according to an embodiment.

FIG. 5 is a block diagram explaining the security device 220 of FIG. 1.

Referring to FIG. 5, the security device 220 may include a storage device 222, a key deriver 224, a key processor 226, a secure booter 227, an internal memory 228, and a processor 229.

The storage device 222 may store the root key 302. The root key 302 stored in the storage device 222 may be the same key as the root key 302 of the boot key protection system 110 (of FIG. 2) described above.

In some embodiments, the storage device 222 may include a nonvolatile memory. For example, the storage device 222 may be implemented as various memories such as one-time programmable (OTP), few-time programmable (FTP), multi-time programmable (MTP), and the like. It is understood, however, that one or more other embodiments are not limited thereto and may be freely modified and implemented as needed as long as the storage device 222 can store the root key 302 fixed at the time of mass production of the security device 220.

The key deriver 224 may generate a derived key 352 (of FIG. 12) required to verify the protected boot key 212a included in the boot image 212 stored in the storage device 210 (of FIG. 1).

Specifically, the key deriver 224 may generate, using the root key 302, the derived key 352 (of FIG. 12) required or used to verify the protected boot key 212a according to the key protection method 306 (of FIG. 2). Similarly, in this case, if the additional information 304 (of FIG. 2) is determined as necessary or to be used for security by the user, the key deriver 224 may generate the derived key 352 (of FIG. 12) in consideration of the additional information 304 (of FIG. 2), e.g., user additional information.

In some embodiments, the key protection method 306 (of FIG. 2) or the additional information 304 (of FIG. 2) required or used by the key deriver 224 to generate the derived key 352 (of FIG. 12) may be obtained from the boot image 212. Alternatively, in some other embodiments, the key protection method 306 (of FIG. 2) or the additional information 304 (of FIG. 2) required or used by the key deriver 224 to generate the derived key 352 (of FIG. 12) may be provided from the secure boot management system 100 (of FIG. 1).

The key deriver 224 may have a configuration corresponding to the key deriver 112 of the boot key protection system 110 of FIG. 2 described above, which is described in more detail below with reference to FIG. 6.

Figure 6:
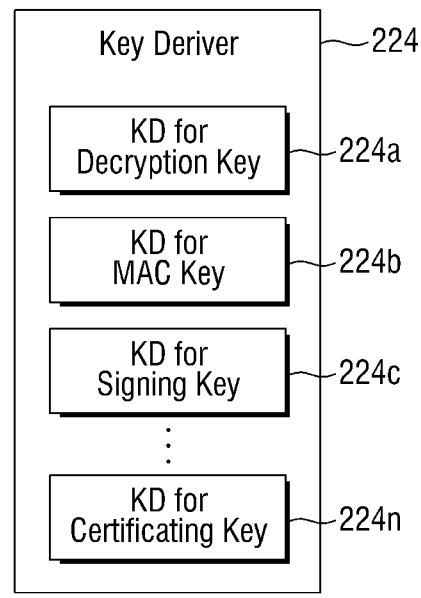
FIG. 6 is a block diagram explaining a key deriver of FIG. 5, according to an embodiment.

FIG. 6 is a block diagram explaining the key deriver 224 of FIG. 5, according to an embodiment.

Referring to FIG. 6, similarly to the key deriver 112 of FIG. 2 described above, the key deriver 224 may include a plurality of sub-key derivers 224a to 224n to generate the derived key 352 (of FIG. 12) used in various key protection methods 306 (of FIG. 2).

Although only four sub-key derivers 224a, 224b, 224c, and 224n are exemplarily shown in detail in the drawing, it is understood that one or more other embodiments are not limited to the illustrated examples. For example, the key deriver 224 may include additional and/or different sub-key derivers, or may include fewer sub-key derivers.

If (or based on) a secret key cryptography was used as the key protection method 306 (of FIG. 2) for the protected boot key 212a (of FIG. 5), the sub-key deriver 224a may generate a derived key 352 (of FIG. 12) used for secret key decryption.

If (or based on) a MAC operation was used as the key protection method 306 (of FIG. 2) for the protected boot key 212a (of FIG. 5), the sub-key deriver 224b may generate a derived key 352 (of FIG. 12) used for MAC verification.

If (or based on) a public key-based signature was used as the key protection method 306 (of FIG. 2) for the protected boot key 212a (of FIG. 5), the sub-key deriver 224c may generate a derived key 352 (of FIG. 12) used for electronic signature verification.

If (or based on) a network standard certificate was used as the key protection method 306 (of FIG. 2) for the protected boot key 212a (of FIG. 5), the sub-key deriver 224n may generate a derived key 352 (of FIG. 12) used for certificate verification.

Referring back to FIG. 5, the key processor 226 performs verification on the protected boot key 212a according to the key protection method using a derived key 352 (of FIG. 12) generated from the key deriver 224. When the verification is completed, the key processor 226 may extract, from the protected boot key 212a, a boot key 362 (of FIG. 13) for verifying the protected execution image 212b.

The key processor 226 may have a configuration corresponding to the key protector 114 of the boot key protection system 110 of FIG. 2 described above, which is described in more detail below with reference to FIG. 7.

Figure 7:
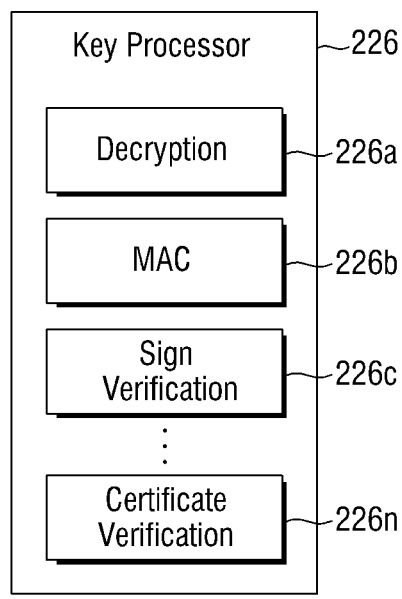
FIG. 7 is a block diagram explaining a key processor of FIG. 5, according to an embodiment.

FIG. 7 is a block diagram explaining the key processor 226 of FIG. 5, according to an embodiment.

When (or based on) the key protector 114 of the boot key protection system 110 (of FIG. 2) includes sub-key protectors 114a to 114n (of FIG. 2) to protect the boot key 308 (of FIG. 2) using various key protection methods 306 (of FIG. 2), the key processor 226 may also include sub-key processors 226a to 226n for verifying the respective key protection methods 306 (of FIG. 2).

Although only four sub-key processors 226a, 226b, 226c, and 226n are exemplarily shown in detail in the drawing, it is understood that one or more other embodiments are not limited thereto. For example, the key processor 226 may include additional and/or different sub-key processors, or fewer sub-key processors.

If (or based on) a secret key cryptography was used as the key protection method 306 (of FIG. 2) for the protected boot key 212a (of FIG. 5), the sub-key processor 226a may decrypt the protected boot key 212a (of FIG. 5) using the derived key 352 (of FIG. 12), and extract the boot key 362 (of FIG. 13) from the protected boot key 212a (of FIG. 5).

If (or based on) a MAC operation was used as the key protection method 306 (of FIG. 2) for the protected boot key 212a (of FIG. 5), the sub-key processor 226b may perform MAC verification for the protected boot key 212a (of FIG. 5) using the derived key 352 (of FIG. 12), and extract the boot key 362 (of FIG. 13) from the protected boot key 212a (of FIG. 5).

If (or based on) a public key-based signature was used as the key protection method 306 (of FIG. 2) for the protected boot key 212a (of FIG. 5), the sub-key processor 226c may verify the electronic signature of the protected boot key 212a (of FIG. 5) using the derived key 352 (of FIG. 12), and extract the boot key 362 (of FIG. 13) from the protected boot key 212a (of FIG. 5).

If (or based on) a network standard certificate was used as the key protection method 306 (of FIG. 2) for the protected boot key 212a (of FIG. 5), the sub-key deriver 226n may verify the certificate of the protected boot key 212a (of FIG. 5) using the derived key 352 (of FIG. 12), and extract the boot key 362 (of FIG. 13) from the protected boot key 212a (of FIG. 5).

Figure 13:
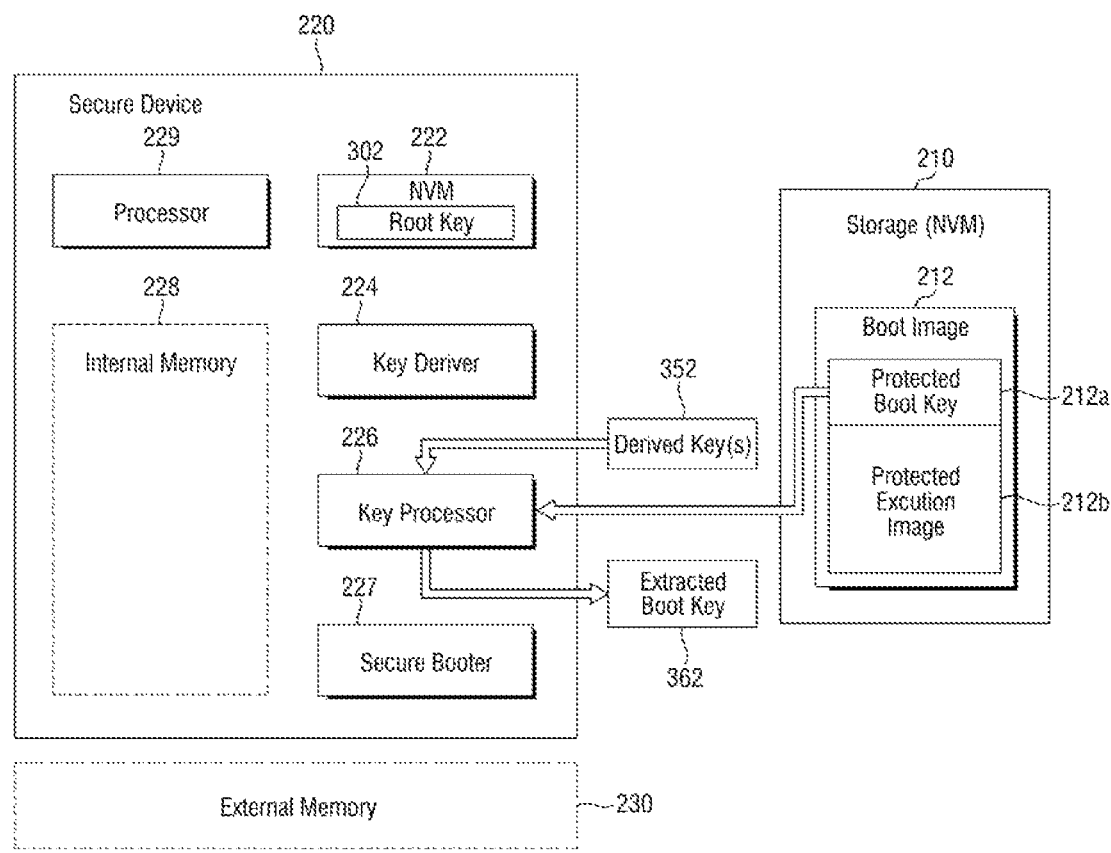

Referring back to FIG. 5, the secure booter 227 may perform verification on the protected execution image 212b using the extracted boot key 362 (of FIG. 13).

After the verification on the protected execution image 212b is completed, the secure booter 227 may store a verified execution image 372 (of FIG. 14) in an internal memory 228 or in an external memory located outside the security device 220, thereby allowing the processor 229 to proceed with the boot process.

In some embodiments, a plurality of key protection methods may be used to extract the boot key 362 (of FIG. 13) from the protected boot key 212a. For example, if a first key protection method and a second key protection method, which are different from each other, were used to generate the protected boot key 212a, the key deriver 224 may generate, from the root key 302, a first derived key required or used to verify the first key protection method, and generate, from the root key 302, a second derived key required or used to verify the second key protection method.

That is, the key deriver 224 may generate, from the same root key 302, the first derived key and the second derived key that are different from each other.

In this case, the key processor 226 may perform, on the protected boot key 212a, first verification using the first derived key according to the first key protection method, and second verification using the second derived key according to the second key protection method. Accordingly, the key processor 226 may extract the boot key 362 (of FIG. 13) from the protected boot key 212a.

In other words, many various key protection methods may be used to extract the boot key 362 (of FIG. 13) from the protected boot key 212a according to the needs or settings of the user.

In some embodiments, as illustrated in FIG. 4, when a plurality of boot images 212 to 219 has been stored in the storage device 210, the security device 220 may perform a different boot operation for each of the boot images 212 to 219.

For example, when (or based on) a first boot image 212 including a first protected boot key 212a and a first protected execution image 212b, and a second boot image 213 including a second protected boot key 213a different from the first protected boot key 212a and a second protected execution image 213b different from the first protected execution image 212b have been stored in the storage device 210, the key deriver 224 may generate a first derived key using the root key 302 and the first protected boot key 212a, and generate a second derived key using the root key 302 and the second protected boot key 213a.

Then, the key processor 226 may extract a first boot key from the first protected boot key 212a using the first derived key and the first protected boot key 212a, and extract a second boot key from the second protected boot key 213a using the second derived key and the second protected boot key 213a.

Thereafter, the secure booter 227 may perform a first booting operation using the first boot key, and perform a second booting operation using the second boot key.

Hereinafter, a boot image generating method according to one or more embodiments is described with reference to FIGS. 8 to 10.

Figure 8:
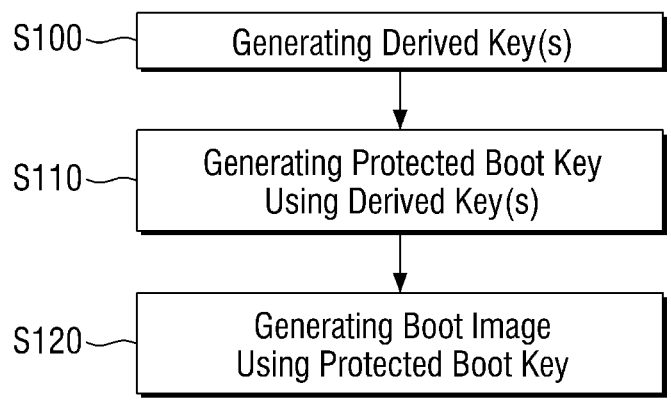
FIG. 8 is a flowchart illustrating a boot image generating method according to an embodiment.

FIG. 8 is a flowchart illustrating a boot image generating method according to an embodiment. FIGS. 9 and 10 are diagrams describing a boot image generating method according to some embodiments.

First, referring to FIG. 8, a derived key is generated (operation S100).

Figure 9:
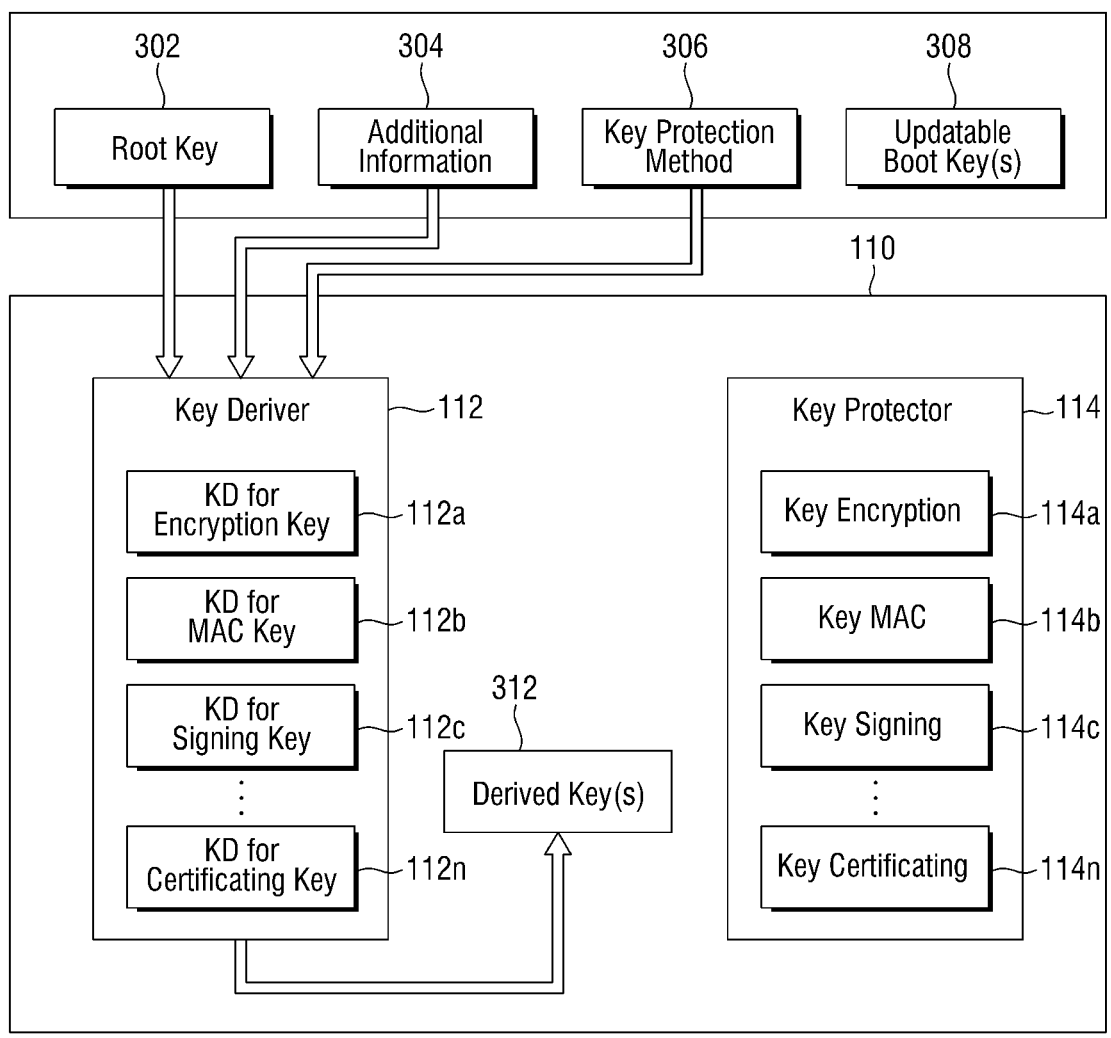
FIGS. 9 and 10 are diagrams describing a boot image generating method according to one or more embodiments.

For example, referring to FIG. 9, the key deriver 112 of the boot key protection system 110 is provided with the root key 302, the user additional information 304, and the key protection method 306. The key deriver 112 may generate, using the root key 302, the derived key 312 required or used to protect the boot key 308 according to the provided key protection method 306.

In this case, if a plurality of key protection methods 306 have been provided, the key deriver 112 may generate a plurality of derived keys 312 required for the key protection methods 306, respectively.

Referring back to FIG. 8, a protected boot key is generated using the derived key (operation S110).

Figure 10:
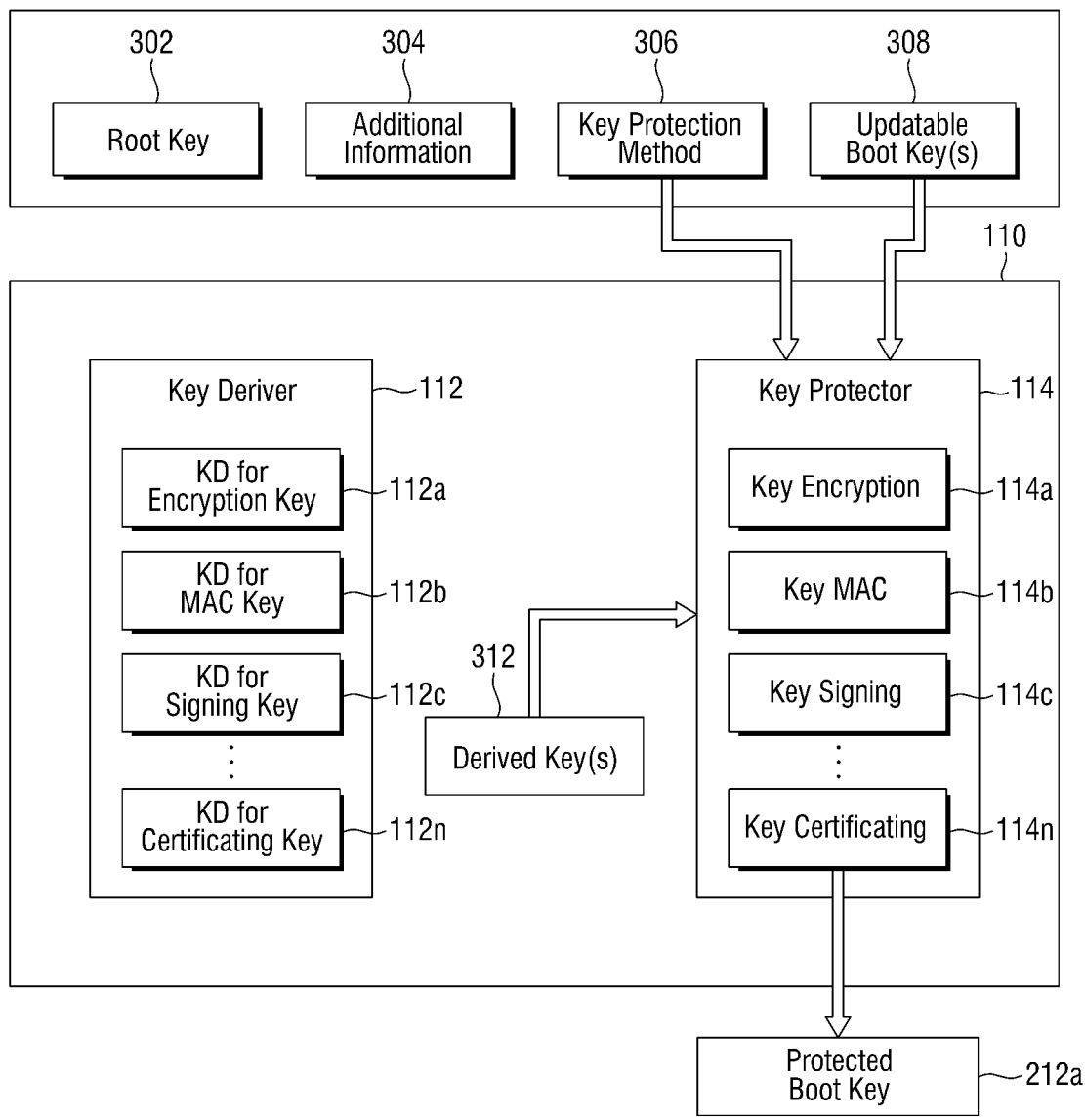

For example, referring to FIG. 10, the key protector 114 of the boot key protection system 110 may generate the protected boot key 212a from the boot key 308 according to the provided key protection method 306 by using the derived key 312.

In this case, if a plurality of key protection methods 306 and a plurality of derived keys 312 have been provided, the key protector 114 may generate the protected boot key 212*a* from the boot key 308 by using the plurality of derived keys 312 required or used for the respective key protection methods 306. Therefore, in this embodiment, the boot key 308 may be a boot key that is updatable several times.

Referring back to FIG. 8, a boot image is created using the protected boot key (operation S120).

For example, referring to FIG. 3, the boot image generation system 120 of the boot key protection system 110 is provided with the protected boot key 212*a*, the boot key 308, and the execution image 332. The boot image generation system 120 may perform a protecting operation on the execution image 332 by using the boot key 308.

As a result, the boot image 212 may be created, and may include the protected boot key 212*a* and the protected execution image 212*b*.

Only one protected execution image 212*b* has been illustrated in the drawing for simplicity of description, but it is understood that one or more other embodiments are not limited thereto. The boot image generation system 120 may generate a plurality of boot images 212 including a plurality of protected execution images 212*b* by using a plurality of different protected boot keys 212*a* generated by different key protection methods 306 (of FIG. 2).

Next, a boot chain execution method according to one or more embodiments will be described with reference to FIGS. 11 to 15.

Figure 11:
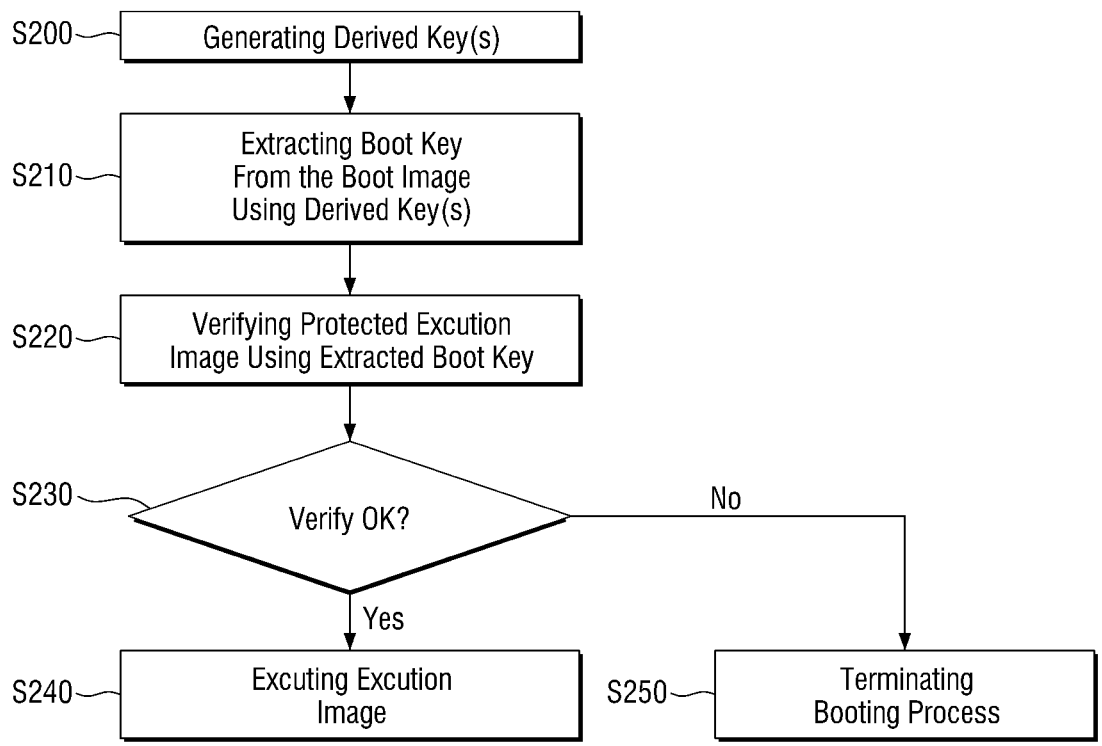
FIG. 11 is a flowchart illustrating a boot chain execution method according to an embodiment.

FIG. 11 is a flowchart illustrating a boot chain execution method according to an embodiment. FIGS. 12 to 15 are diagrams describing a boot chain execution method according to some embodiments.

First, referring to FIG. 11, a derived key is generated (operation S200).

Figure 12:
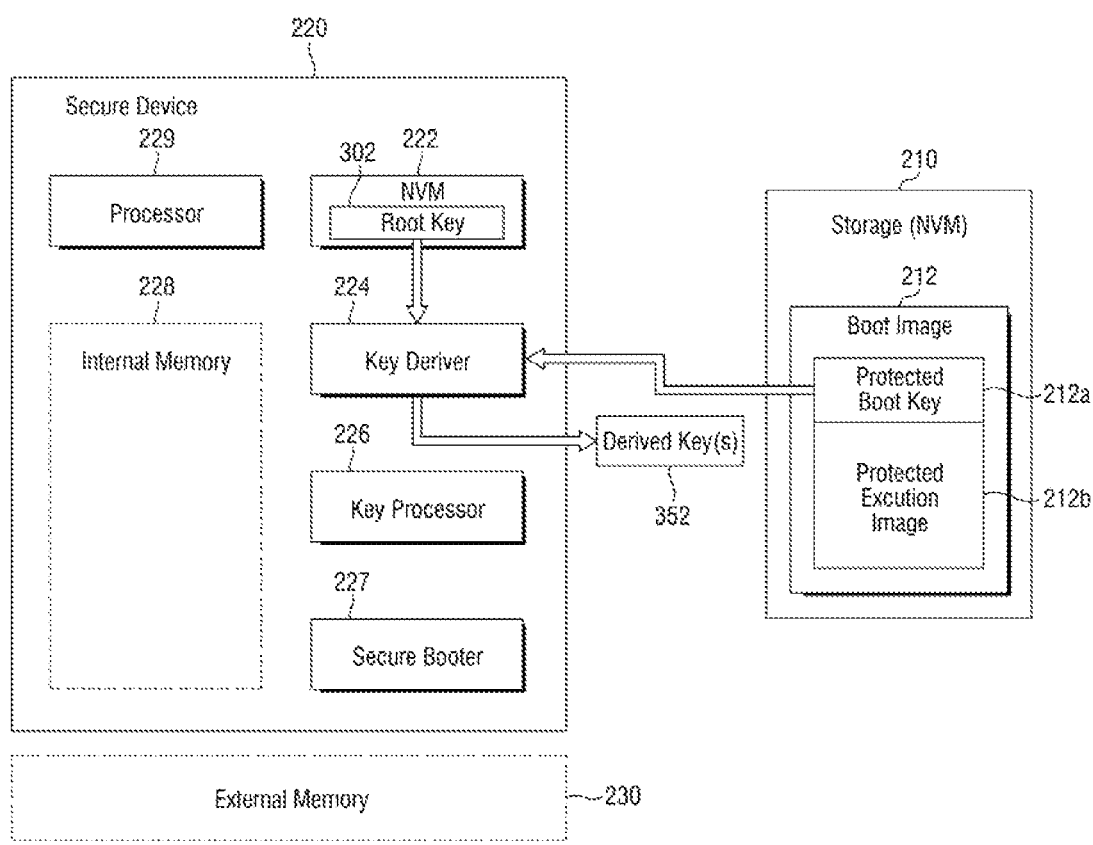
FIGS. 12 to 15 are diagrams describing a boot chain execution method according to one or more embodiments.

For example, referring to FIG. 12, the key deriver 224 may generate, using the root key 302, a derived key 352 needed or used to verify the protected boot key 212*a* according to the key protection method 306 (of FIG. 2). At this time, if the additional information 304 (of FIG. 2) is determined as necessary or to be used for security by the user, the key deriver 224 may generate the derived key 352 in consideration of the additional information 304 (of FIG. 2), e.g., user additional information.

In some embodiments, the key protection method 306 (of FIG. 2) or the additional information 304 (of FIG. 2) required or used by the key deriver 224 to generate the derived key 352 may be obtained from the boot image 212. Alternatively, in some other embodiments, the key protection method 306 (of FIG. 2) or the user additional information 304 (of FIG. 2) required or used by the key deriver 224 to generate the derived key 352 may be provided from the secure boot management system 100 (of FIG. 1).

In some embodiments, a plurality of key protection methods may be used to extract the boot key 362 from the protected boot key 212*a*. For example, when (or based on) a first key protection method and a second key protection method, which are different from each other, were used to generate the protected boot key 212*a*, the key deriver 224 may generate from the root key 302 a first derived key needed or used to verify the first key protection method and generate from the root key 302 a second derived key needed or used to verify the second key protection method. That is, the key deriver 224 may generate a plurality of derived keys 352.

Next, referring to FIG. 11, a boot key is extracted from the boot image by using the derived key (operation S210).

For example, referring to FIG. 13, the key processor 226 may perform verification on the protected boot key 212*a* according to the key protection method using the derived key 352 generated from the key deriver 224. When the verification is completed, the key processor 226 may extract the boot key 362 for verifying the protected execution image 212*b* from the protected boot key 212*a*.

In some embodiments, if a plurality of key protection methods are used to extract the boot key 362 from the protected boot key 212*a*, the key processor 226 may perform first verification on the protected boot key 212*a* by using a first derived key 352 according to a first key protection method and perform second verification on the protected boot key 212*a* by using a second derived key 352 according to a second key protection method, thereby extracting the boot key 362 from the protected boot key 212*a*.

In other words, many various key protection methods may be used to extract the boot key 362 from the protected boot key 212*a* according to the needs or settings of the user.

Next, referring to FIG. 11, the protected execution image is verified using the extracted boot key (operation S220). If (or based on) the verification is successful (Yes in step S230), the execution image is executed to perform a boot chain (step S240). If (or based on) the verification fails (No in step S230), a boot process is terminated (step S250).

Figure 14:
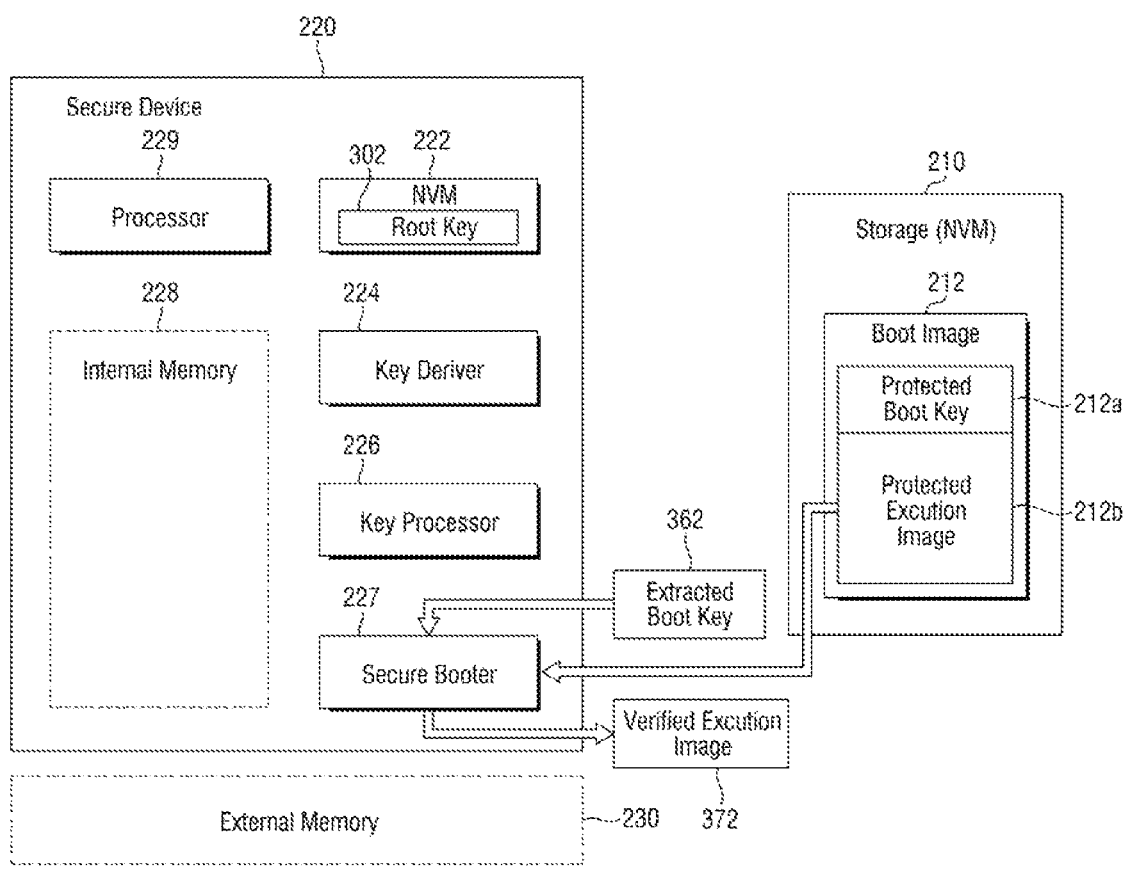

For example, referring to FIG. 14, the secure booter 227 may perform verification on the protected execution image 212*b* by using the boot key 362 extracted by the key processor 226.

Figure 15:
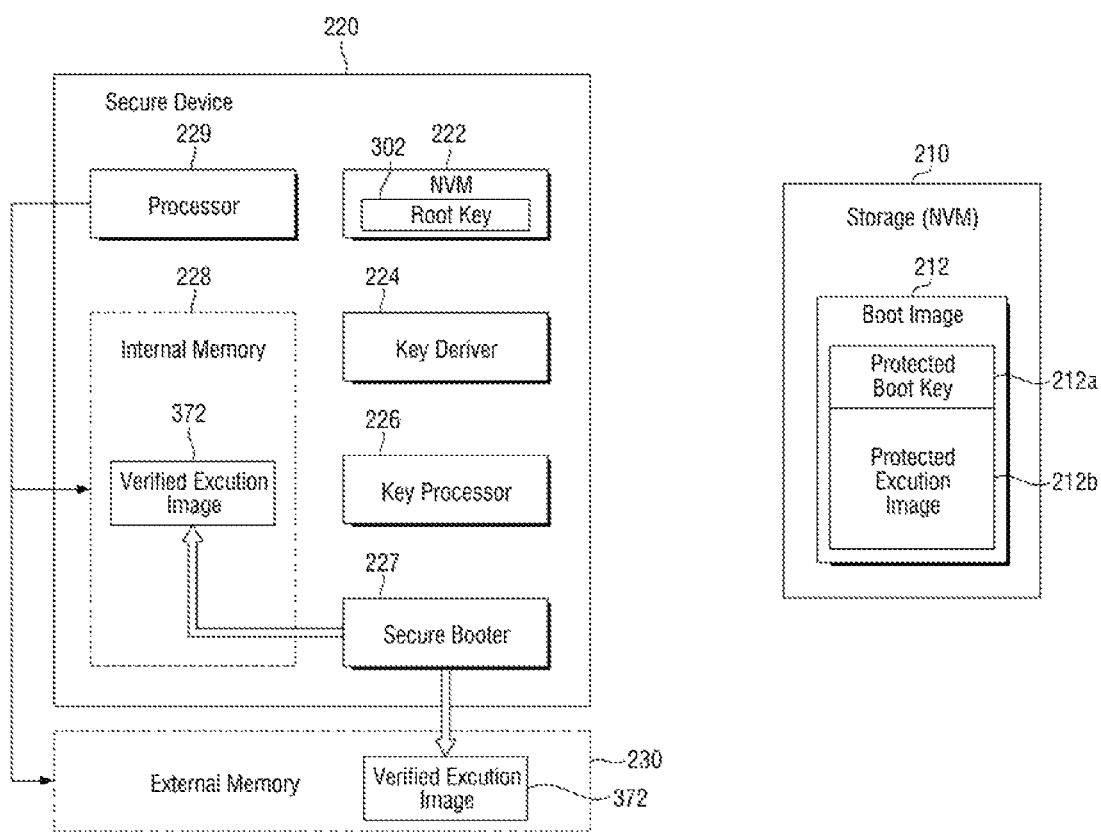

If (or based on) the verification is successful, as shown in FIG. 15, the secure booter 227 may store the verified execution image 372 in the internal memory 228 of the security device 220 or in an external memory 230 located outside the security device 220, so that the processor 229 may proceed with a boot process.

On the other hand, if (or based on) the verification fails, the boot process may be terminated because the reliability of the boot image is not secured.

In some embodiments, the boot process execution operation of the secure booter 227 may be modified and executed differently from the above. For example, unlike the above-described embodiment, prior to the verification of the protected execution image 212*b*, the secure booter 227 may first transfer the protected execution image 212*b* to the internal memory 228 or to the external memory 230 located outside the security device 220. Thereafter, the secure booter 227 may perform a secure boot process including the above-described verification. That is, the boot process execution operation of the secure booter 227 is not limited to the illustrated embodiment.

Figure 16:
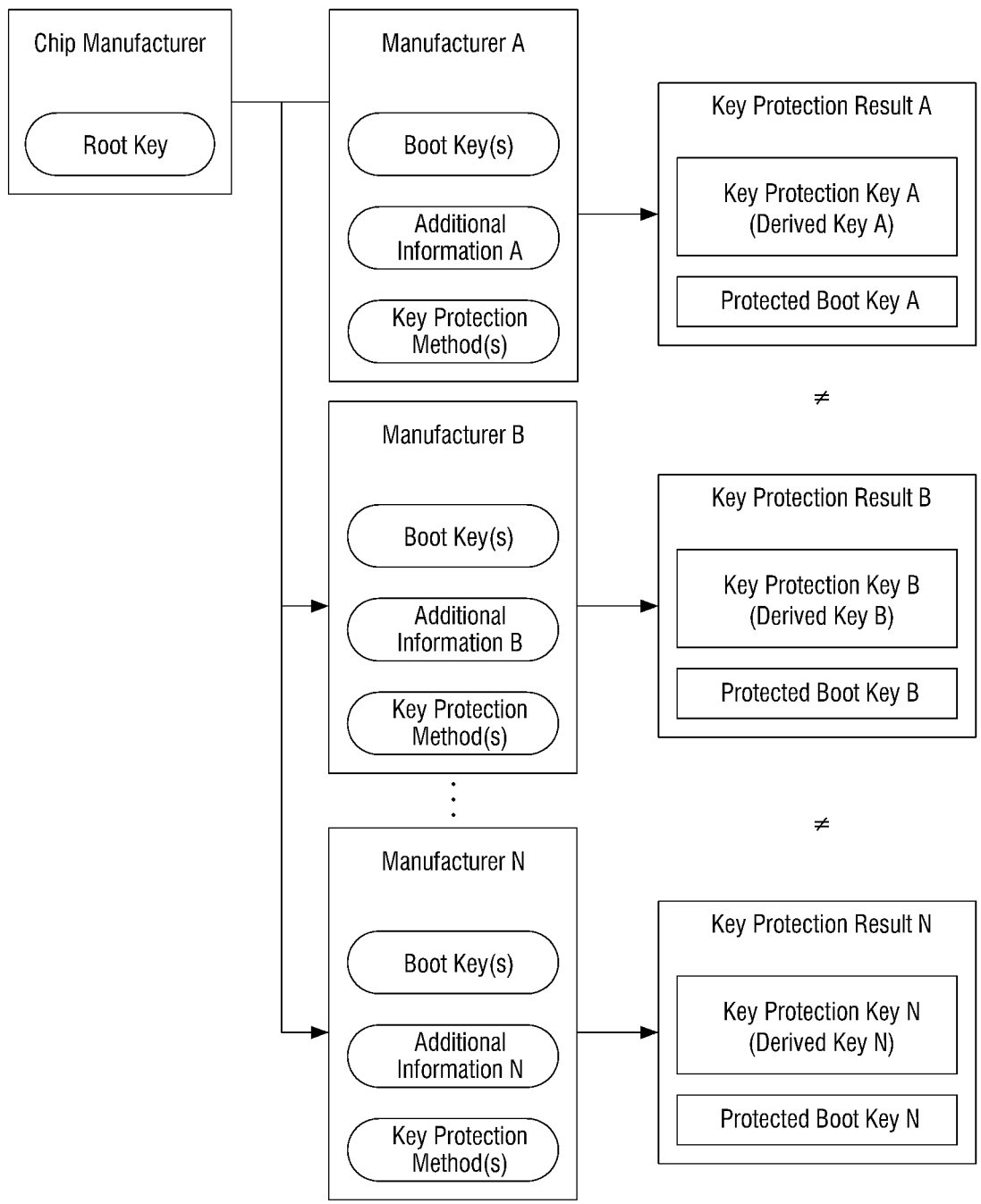
FIGS. 16 and 17 are diagrams describing an effect of a security system according to one or more embodiments.
Figure 17:
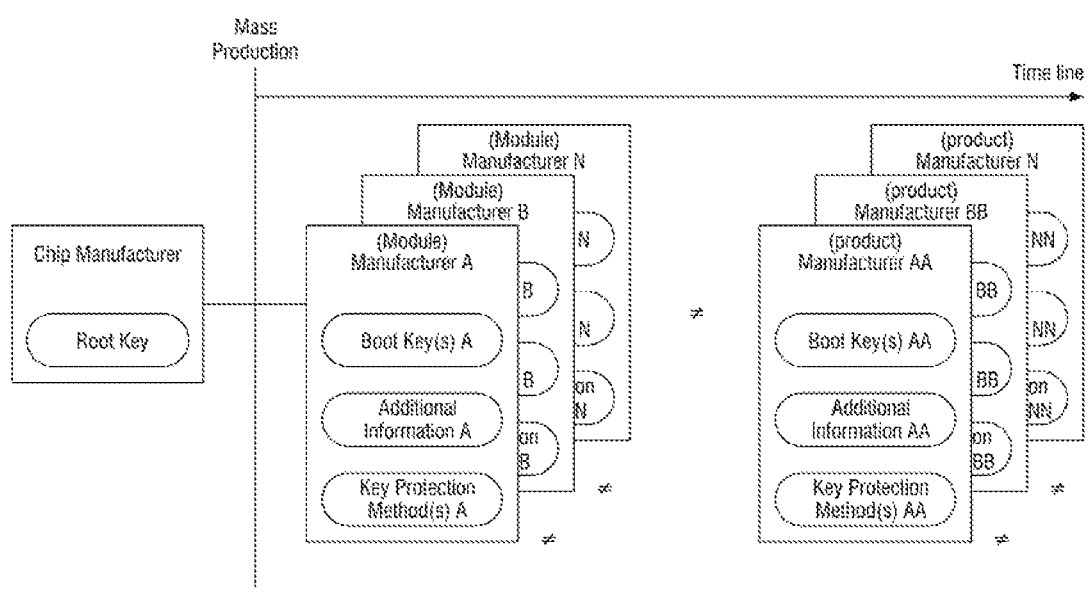

FIGS. 16 and 17 are diagrams describing an effect of a security system according to one or more embodiments.

Referring to FIGS. 16 and 17, in the security system 1 described above, even though one root key is determined at the time of chip manufacturing, a boot key may be freely selected, updated, and if unnecessary, discarded during the product life cycle.

First, in the process of deriving a key protection key (a derived key) for protecting the boot key, a key product derived may vary depending on the key protection method or the user additional information. That is, even if module or product manufacturers select the same boot key and the same method for protecting the boot key, the derived keys may be generated differently from each other by inputting various information such as module provider information, product manufacturer information, product manufacturing date, and the like as the additional information. Then, the protected boot keys may also be generated differently from each other. Therefore, even under the same conditions, each manufacturer may configure a safe boot chain individually through the difference of the additional information, e.g., user additional information or user-specific additional information.

Accordingly, even in a case where there are sellers or providers consigning manufacturing to multiple manufacturers, or in a case where multiple providers utilize devices supplied by one chip manufacturer, there is no connection between them in relation to a boot key and a method used for the boot key protection, so that a system may operate with an independent and secure boot chain.

For the root key set by an initial chip (e.g., a security device) manufacturer, a module provider or a product manufacturer may selectively apply a boot key and its protection method during the product manufacturing process. Further, even under the same conditions, different outputs may be generated depending on the user additional information. Thus, it is possible for the multiple providers to operate individual and independent boot chains.

Accordingly, it is possible for the storage device 210 (of FIG. 1) to store, at a first time point, a first boot image including a first protected boot key and to store, at a second time point following the first time point, a second boot image including a second protected boot key that is different from the first protected boot key.

In this case, the security device 220 (of FIG. 1) stores the same root key at the first time point and at the second time point, but the secure boot chain execution process may be different at those time points.

In detail, at the first time point, the security device 220 (of FIG. 1) may generate a first derived key using the stored root key and the first protected boot key, extract a first boot key using the generated first derived key, and perform a boot operation using the extracted first boot key. Further, at the second time point, the security device 220 (of FIG. 1) may generate a second derived key, which is different from the first derived key, using the stored root key and the second protected boot key, extract a second boot key using the generated second derived key, and perform a boot operation using the extracted second boot key.

In summary, in the security system 1 described above, the following effects can be obtained.

First, during the product life cycle, in implementing the update and disposal of the boot key required or used for the safe boot process, it is possible to manage the boot key at minimal cost without using an additional storage space and management device.

Next, during the product life cycle, cryptography and its resultant boot key protection method required or used for the safe boot process can be changed without restriction.

Lastly, since there is no particular connection between the root key determined at the time of chip manufacture and the boot key updated after mass production, even if the root key is exposed, the leak of the boot key can be prevented.

Hereinafter, various examples of the above-described electronic device 200 (of FIG. 1) are described below with reference to FIGS. 18 to 21.

FIGS. 18 to 21 are block diagrams illustrating examples of the electronic device 1000, 2000, 3000, 4000 illustrated in FIG. 1, according to various embodiments.

Figure 18:
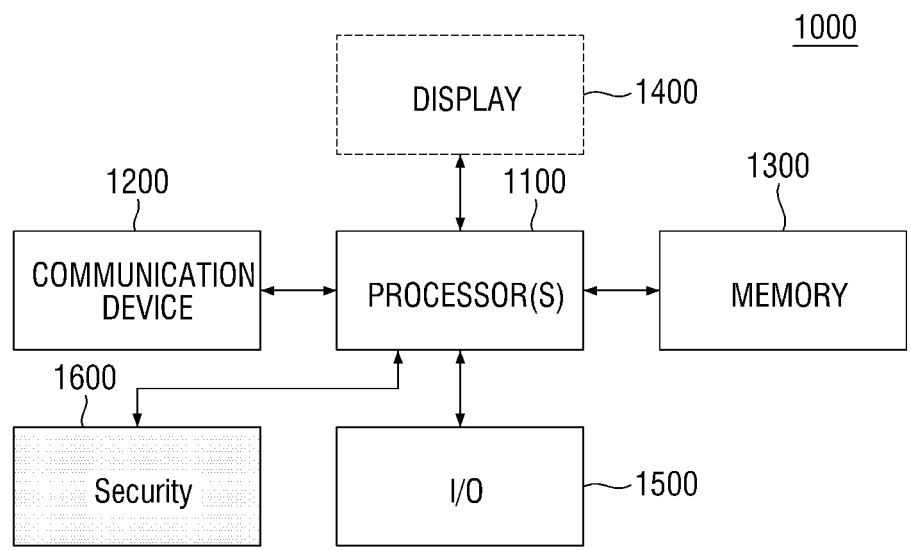
FIGS. 18 to 21 are block diagrams illustrating examples of an electronic device illustrated in FIG. 1, according to one or more embodiments.

Referring to FIG. 18, the electronic device 1000 may include at least one processor 1100, a network interface 1200, a memory 1300, a display device 1400, an input/output device 1500, and a security chip 1600.

The processor 1100 may execute a secure boot chain using the security chip 1600. The processor 1100 may execute a program and control the electronic device 1000. The electronic device 1000 may be connected to an external device (e.g., a personal computer or a network) to exchange data through the input/output device 1500.

The network interface 1200 may be implemented to communicate with an external network by various wired or wireless methods. The memory 1300 may include an instruction that is readable by a computer. The processor 1100 may perform the aforementioned operations as the instruction stored in the memory 1300 is executed in the processor 1100. The memory 1300 may be a volatile memory or a nonvolatile memory.

The memory 1300 may include a storage device to store user's data. The storage device may be an embedded multimedia card (eMMC), a solid state drive (SSD), a universal flash storage (UFS), or the like. The storage device may include at least one nonvolatile memory device. The nonvolatile memory device may be a NAND flash memory, a vertical NAND (VNAND) flash memory, a NOR flash memory, a resistive random access memory (RRAM), a phase change RAM (PRAM), a magnetic RAM (MRAM), a ferroelectric RAM (FRAM), a spin transfer torque RAM (STT-RAM), or the like.

The display device 1400 may be implemented or configured to output data.

The input/output device 1500 may include input means such as a touch pad, a keypad, and an input button, and output means such as a display and a speaker.

The security chip 1600 may be implemented or configured to execute a boot chain. The security chip 1600 may execute the secure boot chain according to the above-described manner. The security chip 1600 may include a hardware security module (HSM) to safely store a hash value of an execution code used for verifying the integrity of the execution code.

It is understood that embodiments described above (and below) may be implemented as hardware components, software components, and/or combinations of hardware components and software components. For example, the devices, methods, and components described in the embodiments may be implemented using one or more general-purpose computers or special-purpose computers such as a processor, a controller, an arithmetic logic unit (ALU), a digital signal processor, a microcomputer, a field programmable gate array (FPGA), a programmable logic unit (PLU), a microprocessor, or any other device capable of executing an instruction and responding thereto. The processing device may execute an operating system (OS) and one or more software applications executed on the operating system.

Meanwhile, a boot chain execution method according to an embodiment is applicable to Internet of Things (IoT), Mobile, and Automotive devices.

Figure 19:
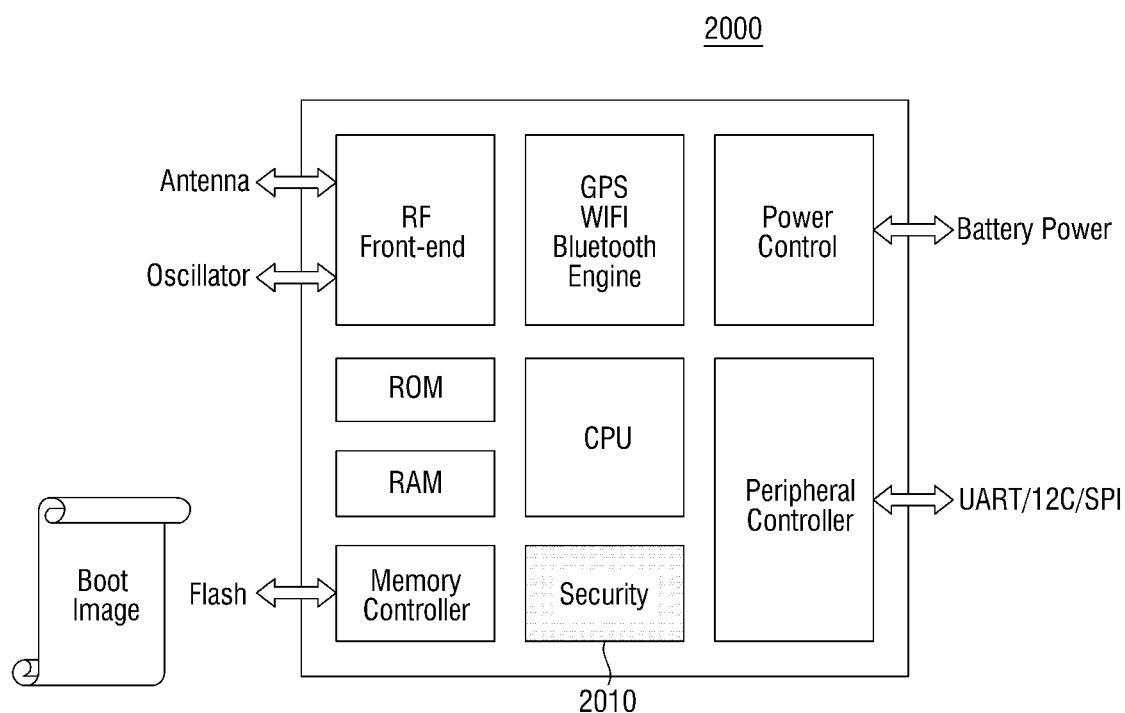

Referring to FIG. 19, an IoT device 2000 may include a communication front-end block, a wireless communication block, a power control block, a read only memory (ROM), a random access memory (RAM), a memory controller, a security chip 2010, a peripheral controller, and a central processing unit.

The security chip 2010 may be implemented to execute a boot chain of the IoT device 2000. The security chip 2010 may execute a secure boot chain according to the above-described manner.

Figure 20:
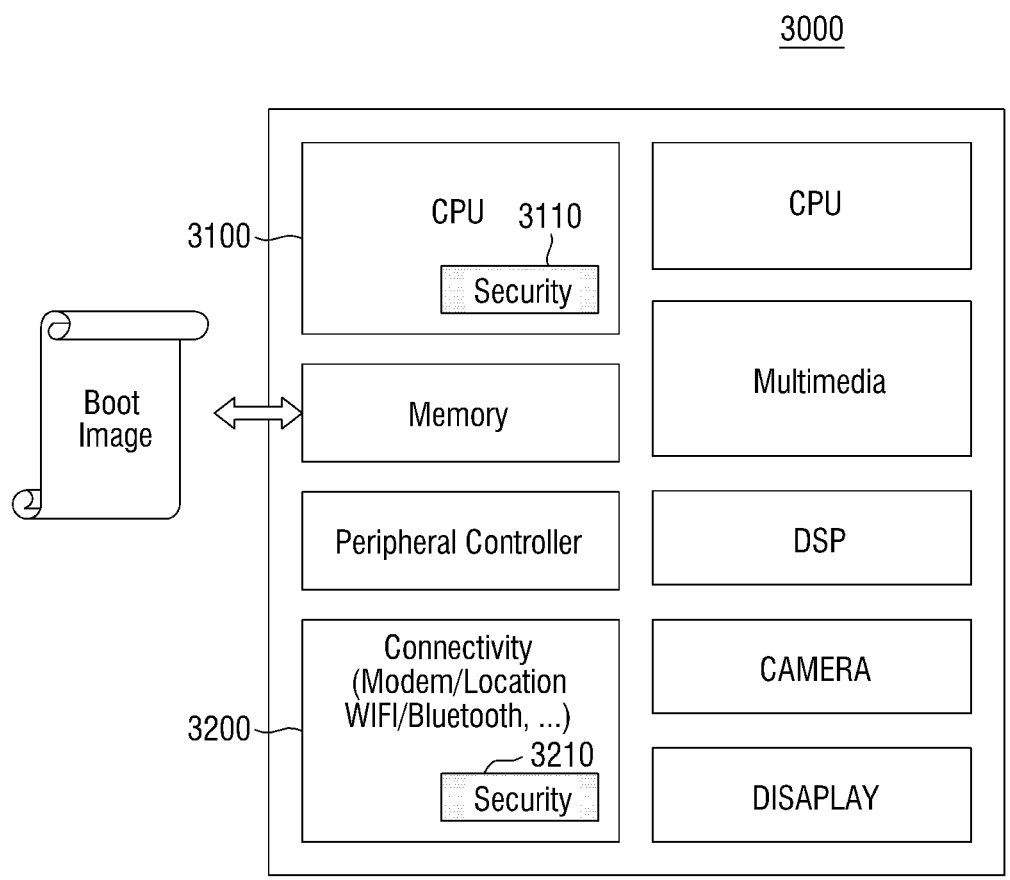

Referring to FIG. 20, a mobile device 3000 may include a central processing unit (CPU) 3100, a memory, a peripheral controller, a communication block 3200, a graphics processing unit (GPU), a multimedia module, a digital signal processor (DSP), a camera, and a display.

The CPU 3100 and the communication block 3200 may include corresponding security chips 3110 and 3210, respectively. In this case, each of the security chips 3110 and 3210 may execute a secure boot chain according to the above-described manner.

Figure 21:
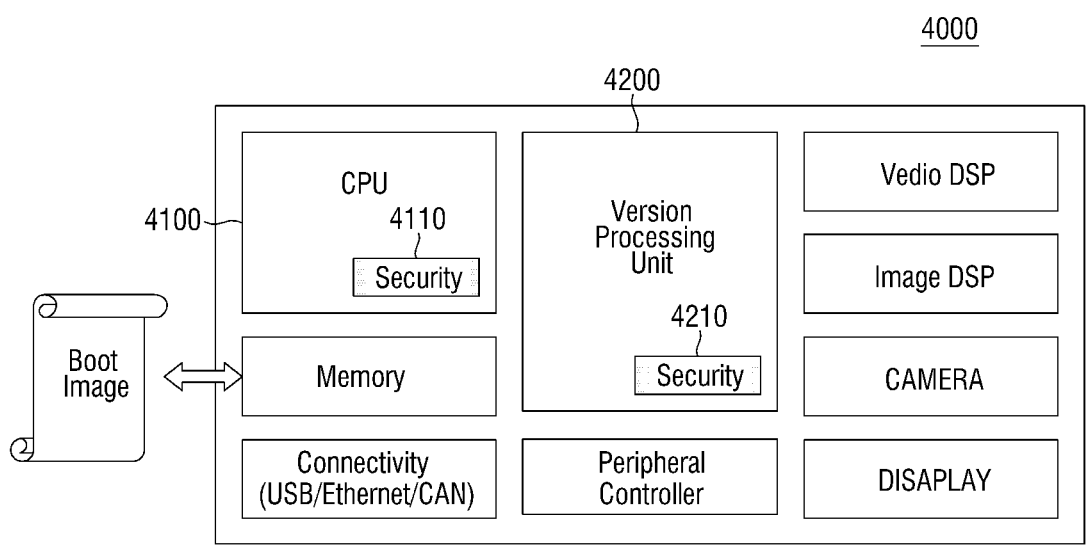

Referring to FIG. 21, a vehicle electronic device 4000 may include a CPU 4100, a memory, a communication block, a vision processing unit 4200, a peripheral controller, a video DSP, an image DSP, a camera, and a display.

The CPU 4100 and the vision processing unit 4200 may include corresponding security chips 4110 and 4210, respectively. In this case, each of the security chips 4110 and 4210 may execute a secure boot chain according to the above-described manner.

For example, a boot key of the vehicle electronic device 4000 may be exposed by a hacker. Once the exposure of the boot key is confirmed, a vehicle manufacturer or a manufacturer of the vehicle electronic device may remove the association with the exposed boot key simply by discarding the exposed boot key and updating a protected boot image using a newly generated boot key according to the above-described manner. Accordingly, the reliability of the secure boot process for the vehicle electronic device 4000 can be maintained.

While exemplary embodiments have been particularly shown and described above, it will be understood that various changes in form and details may be made therein without departing from the spirit and scope of the following claims.

What is claimed is:

1. An electronic device comprising:
   at least one memory configured to:
   at a first time point, store a first boot image including a first protected boot key and a protected execution image, and
   at a second time point following the first time point, store a second boot image including a second protected boot key different from the first protected boot key; and
   at least one processor configured to:
   store a same root key at the first time point and the second time point,
   at the first time point, extract a first boot key using the stored same root key and the first protected boot key and perform a boot operation using the extracted first boot key, and
   at the second time point, extract a second boot key using the stored same root key and the second protected boot key and perform the boot operation using the extracted second boot key;
   generate a derived key according to a predetermined key protection method using the stored same root key and the first protected boot key and the second protected boot key,
   perform verification according to the predetermined key protection method using the generated derived key to extract a boot key from the protected first boot key and the protected second boot key, and
   perform the boot operation using the extracted boot key.

2. The electronic device of claim 1, wherein the at least one processor is further configured to:
   perform verification on the protected execution image using the extracted boot key, and
   perform the boot operation by executing a verified execution image on which the verification has been completed.

3. The electronic device of claim 1, wherein the at least one processor is further configured to:
   at the first time point, generate a first derived key using the stored same root key and the first protected boot key, and extract the first boot key using the generated first derived key, and
   at the second time point, generate a second derived key using the stored same root key and the second protected boot key, and extract the second boot key using the generated second derived key.

4. The electronic device of claim 3, wherein the generated first derived key and the generated second derived key are different from each other.

5. The electronic device of claim 1, wherein:
   the at least one memory is further configured to store:
   the first boot image including the first protected boot key and a first protected execution image, and
   the second boot image including the second protected boot key and a second protected execution image different from the first protected execution image; and
   wherein the at least one processor is further configured to:
   extract the first boot key using the stored same root key and the first protected boot key, and perform a first boot operation using the extracted first boot key, and
   extract the second boot key using the stored same root key and the second protected boot key, and perform a second boot operation using the extracted second boot key.

6. The electronic device of claim 5, wherein the at least one processor is further configured to:
   generate a first derived key using the stored same root key and the first protected boot key to extract the first boot key using the generated first derived key, and
   generate a second derived key using the stored same root key and the second protected boot key to extract the second boot key using the generated second derived key.

7. The electronic device of claim 1, wherein:
   the predetermined key protection method includes a first key protection method and a second key protection method which are different from each other; and
   the at least one processor is further configured to extract the boot key from the first protected boot key and the second protected boot key by performing first verification according to the first key protection method and second verification according to the second key protection method.

8. The electronic device of claim 7, wherein:
   the derived key includes a first derived key generated according to the first key protection method and a second derived key generated according to the second key protection method;
   the at least one processor is further configured to perform the first verification according to the first key protection method using the first derived key; and
   the at least one processor is further configured to perform the second verification according to the second key protection method using the second derived key.

* * * * *